(12) United States Patent
Hsu-Hung

(10) Patent No.: US 10,191,821 B2
(45) Date of Patent: *Jan. 29, 2019

(54) COOPERATIVE DATA RECOVERY IN A STORAGE STACK

(71) Applicant: Dell Products, LP, Round Rock, TX (US)

(72) Inventor: Damon Hsu-Hung, Sudbury, MA (US)

(73) Assignee: Dell Products, LP, Round Rock, TX (US)

( * ) Notice: Subject to any disclaimer, the term of this patent is extended or adjusted under 35 U.S.C. 154(b) by 188 days.

This patent is subject to a terminal disclaimer.

(21) Appl. No.: 14/749,998

(22) Filed: Jun. 25, 2015

(65) Prior Publication Data

US 2015/0309888 A1 Oct. 29, 2015

Related U.S. Application Data

(63) Continuation of application No. 13/796,844, filed on Mar. 12, 2013, now Pat. No. 9,098,444.

(51) Int. Cl.
*G06F 11/07* (2006.01)
*G06F 11/10* (2006.01)
*G06F 11/14* (2006.01)
*G06F 11/16* (2006.01)

(52) U.S. Cl.
CPC ...... *G06F 11/1471* (2013.01); *G06F 11/0784* (2013.01); *G06F 11/1088* (2013.01); *G06F 11/1666* (2013.01); *G06F 2201/84* (2013.01)

(58) Field of Classification Search
CPC ............. G06F 11/0766; G06F 11/0772; G06F 11/0784; G06F 11/0793; G06F 11/14; G06F 11/1402; G06F 11/16; G06F 11/1666; G06F 11/2053
See application file for complete search history.

(56) References Cited

U.S. PATENT DOCUMENTS

| | | |
|---|---|---|
| 5,740,357 A | 4/1998 | Gardiner et al. |
| 6,516,314 B1 | 2/2003 | Birkler et al. |
| 7,681,072 B1 | 3/2010 | Gibson et al. |
| 8,417,987 B1 | 4/2013 | Goel et al. |
| 8,527,990 B1 | 9/2013 | Marathe et al. |

(Continued)

OTHER PUBLICATIONS

Hennessy et al., "Computer Architecture: A Quantitative Approach"—Chapter Five Memory Hierarchy Design (excerpt), 2003,Third edition, pp. 390-402. (Year: 2003).*

*Primary Examiner* — Gabriel Chu
(74) *Attorney, Agent, or Firm* — Hamilton, Brook, Smith & Reynolds, P.C.

(57) ABSTRACT

Example embodiments respond to input/output (I/O) requests to a storage stack having a hierarchy of layers. In one such embodiment, responsive to an I/O request for data from a higher layer of the stack to a lower of the stack in hierarchy order, a first help response is generated at the lower layer and sent to the higher layer to recover the data. In turn, at the higher layer, it is determined whether a recover mechanism can fulfill the I/O request and, if not, a second help response is generated and sent to a next higher layer in the hierarchy. At the next higher layer, it is determined whether a recovery mechanism can fulfill the I/O request and, if not, a third help response is generated and sent to an even next higher layer in the hierarchy.

18 Claims, 8 Drawing Sheets

(56) References Cited

U.S. PATENT DOCUMENTS

| | | |
|---|---|---|
| 9,098,444 B2 | 8/2015 | Hsu-Hung |
| 9,141,495 B2 | 9/2015 | Hsu-Hung et al. |
| 9,378,101 B2 | 6/2016 | Hsu-Hung et al. |
| 2004/0268178 A1 | 12/2004 | Fredin |
| 2004/0268179 A1 | 12/2004 | Stewart |
| 2005/0005200 A1 | 1/2005 | Matena et al. |
| 2006/0015767 A1 | 1/2006 | Sun Hsu et al. |
| 2009/0113241 A1 | 4/2009 | van Ingen et al. |
| 2009/0249119 A1 | 10/2009 | Sethumadhavan et al. |
| 2009/0276661 A1 | 11/2009 | Deguchi et al. |
| 2012/0192037 A1 | 7/2012 | Gibson et al. |
| 2014/0281690 A1 | 9/2014 | Hsu-Hung et al. |
| 2014/0281697 A1 | 9/2014 | Hsu-Hung |
| 2015/0309887 A1 | 10/2015 | Hsu-Hung et al. |

\* cited by examiner

COOPERATIVE DATA RECOVERY IN A STORAGE STACK

RELATED APPLICATION

This application is a continuation of U.S. application Ser. No. 13/796,844, filed Mar. 12, 2013. The entire teachings of the above application are incorporated herein by reference.

BACKGROUND OF THE INVENTION

Drive media errors can be hidden from a user by employing Redundant Array of Independent Disks (RAID) reconstruction. However, RAID reconstruction can fail during degraded operation and results in a RAID puncture.

SUMMARY OF THE INVENTION

The modules of a storage system, which may be arranged as layers in a hierarchical stack, may each exhibit particular modes of transient or permanent data loss, and may each possess recovery mechanisms to access or recover such data. An exemplar is the data loss caused by a disk media defect, which is recovered by a RAID (redundant array of independent disks) reconstruction operation. Recovery mechanisms at different layers typically operate independently, without cooperation.

A method is described to coordinate recovery mechanisms in a storage stack with a hierarchy of layers, such that any layer in a storage stack may handle a transient or permanent data loss event at any other, typically lower, layer in the stack.

In one embodiment, a method of recovering data in a storage stack with a hierarchy of layers includes, upon an input/output (I/O) request from a higher layer of the stack to a lower layer of the stack in hierarchy order, issuing a help response from the lower layer to the higher layer to recover the data. The method further includes processing the help response, at the higher layer, by determining whether one or more recovery mechanisms at the higher layer can fulfill the I/O request and, if so, executing those recovery mechanisms, or otherwise, issuing a further help response to an even higher layer. The method further includes issuing, if a recovery mechanism succeeds, a return code of success or, otherwise, a further help response to an even higher layer.

In one embodiment, the help response may be issued to a layer in the hierarchy that can access snapshots or replicas as a recovery mechanism to fulfill I/O requests. The help response may be issued to a layer in the hierarchy that can access cloud storage or an information dispersal system as a recovery mechanism to fulfill I/O requests. The help response may be issued to a layer in the hierarchy that can perform RAID reconstruction as a recovery mechanism to fulfill I/O requests. The help response may be issued to a layer in the hierarchy that can access alternate communications paths as a recovery mechanism to fulfill I/O requests.

In another embodiment, the hierarchy of layers may include at least one of a disk, a drive, a RAID controller, a cache, a volume manager, a local volume manager, and a network layer.

The method may further include, upon the help response reaching a highest layer of the hierarchy and the highest layer of the hierarchy determining that no recovery mechanism at this highest layer can fulfill the I/O request, issuing a final I/O request to a lower layer in the hierarchy. The final I/O request may instruct the lower layer to issue either an error or a success return code. The method may additionally include generating an error at the highest layer of the hierarchy. The method may also include propagating the final write request in hierarchy order from the highest layer of the hierarchy to a lowest layer. The method may also include propagating an error in hierarchy order from a lowest layer of the hierarchy to the highest layer.

In another embodiment, a system for recovering data in a storage stack with a hierarchy of layers, may include a help response module configured to, upon an I/O request from a higher layer of the stack to a lower layer of the stack in hierarchy order, issue a help response from the lower layer back to the higher layer to recover the data. The system may further include a help module configured to process the help response, at the higher layer, by determining whether a recovery mechanism at the higher layer can fulfill the I/O request and issuing, if so, a return code of success or, if not, a further help response to an even higher layer.

In yet another embodiment, a non-transitory computer readable medium configured to store instructions for recovering data in a storage stack with a hierarchy of layers to be executed by a processor, where the instructions include upon an I/O request from a higher layer of the stack to a lower layer of the stack in hierarchy order, issuing a help response from the lower layer back to the higher layer to recover the data. The instructions may further include processing the help response, at the higher layer, by determining whether a recovery mechanism at the higher layer can fulfill the I/O request and issuing, if so, a return code of success or, if not, a further help response to an even higher layer.

The hierarchy of layers includes at least one of a disk, a drive, a RAID controller, a cache, a volume manager, a local volume manager, and a network layer. Examples of data loss events at each layer can include (a) at a disk layer: media defects, failed disk drives, or temporarily unresponsive disk drives; (b) at a RAID layer: data punctures, or multiple failed drives beyond the redundancy of the RAID configuration; (c) at a cache layer: failure of nonvolatile memory; (d) at a volume manager layer: metadata corruption or lost data; or (e) at a network layer: loss of connectivity. Examples of recovery mechanisms at each layer can include employing methods known in the art, such as (a) at a disk layer: multiple retries, alternate paths, or long timeout settings; (b) at a RAID layer: performing RAID reconstruction; or (c) at a network or volume manager layer: accessing a replica, cloud, or backup. Recovery mechanisms at each layer may further employ proprietary methods, including: data recovery from replicas and snapshots, as disclosed in "Automatic Failure Recovery Using Snapshots And Replicas" by Damon Hsu-Hung et. al, U.S. patent application Ser. No. 13/796,876, hereinafter incorporated by reference in its entirety, or data recovery from an information dispersal system, such as that disclosed in "Systems, methods, and apparatus for subdividing data for storage in a dispersed data storage grid" by Gladwin et al., U.S. Pat. No. 7,953,937, hereinafter incorporated by reference in its entirety. The wide variety of data loss events and recovery mechanisms underscores the need for the coordination method described herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1A:
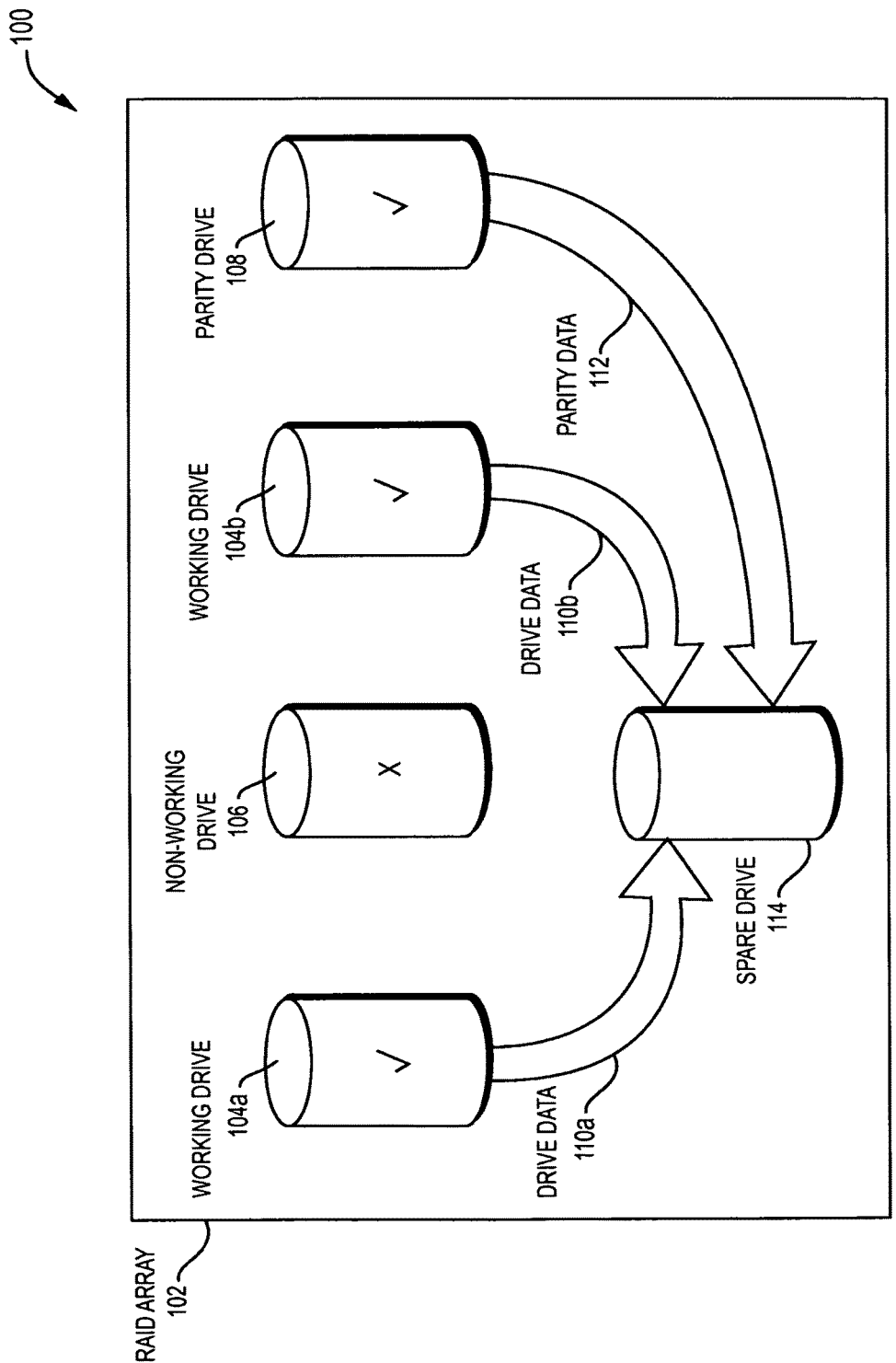
FIG. 1A is a block diagram illustrating an example embodiment of a RAID array.

FIG. 1A is a block diagram 100 illustrating an example embodiment of a RAID array 102. The RAID array 102 includes working drives 104a and 104b, a non-working drive 106, and a parity drive 108. The non-working drive 106 previously stored data that is now inaccessible because of the non-working status of the drive 106. The parity drive 108 stores bits of data that, when combined with all but one of the drives in the RAID array 102, can re-create the data previously stored on the non-working drive 106, or a non-working sector of the non-working drive 106. In this manner, drive data 110a and 110b from working drives 104a and 104b respectively, combined with parity data 112, can create data for spare drive 114 that duplicates the data stored in the non-working drive 106.

Figure 1B:
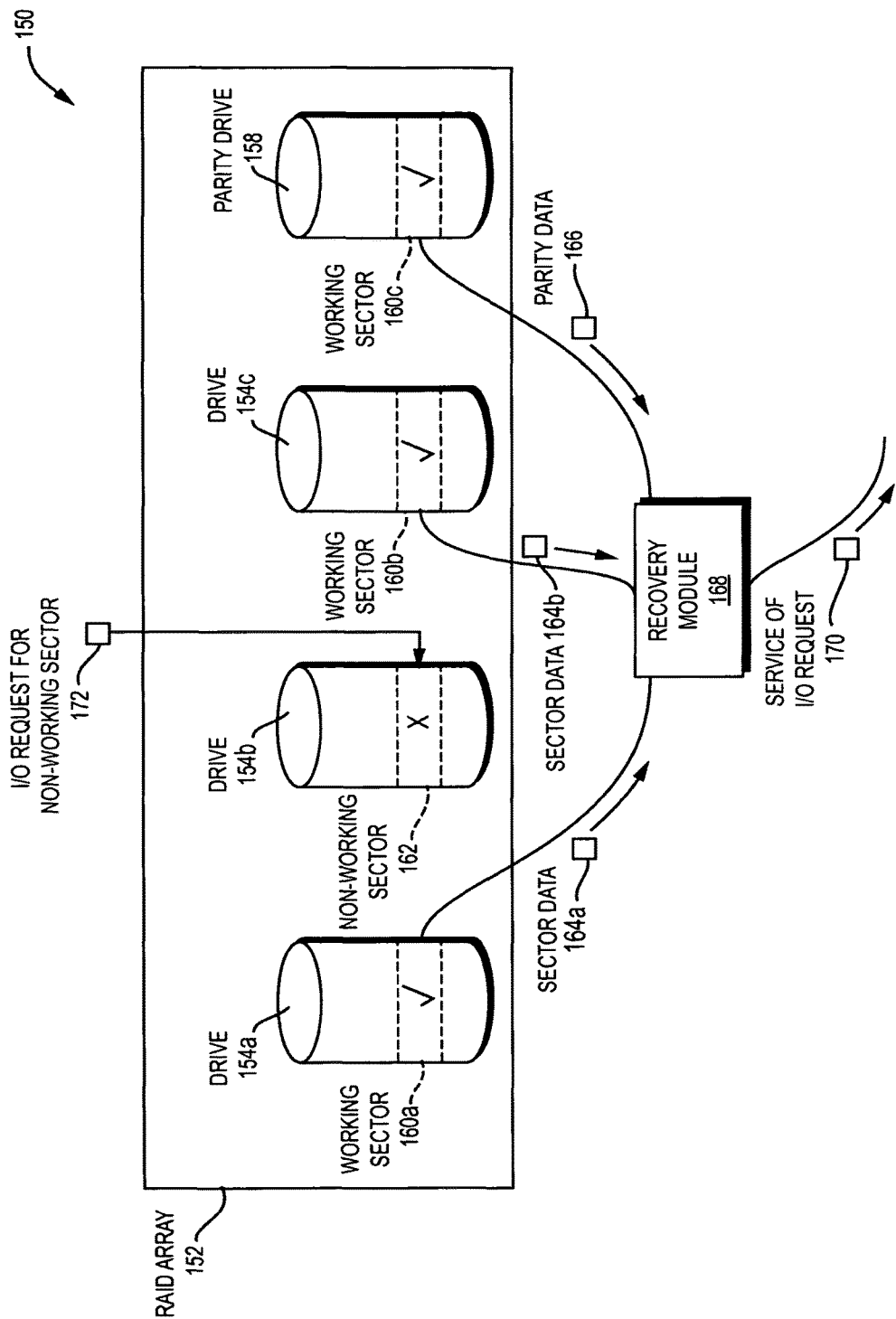
FIG. 1B is a block diagram illustrating an example embodiment of a RAID array.

FIG. 1B is a block diagram 150 illustrating an example embodiment of a RAID array 152. The RAID array 152 includes drives 154a-c and a parity drive 158. Drive 154a includes working sector 160a, drive 154b includes non-working sector 162, drive 154c includes working sector 160b, and parity drive 158 includes working sector 160c. The RAID array 152 receives an input/output (I/O) request 172 for the non-working sector 162. The RAID array 152 then reconstructs the data of the non-working sector 162 using the drives 154a, 154c and parity drive 158 because the non-working sector 162 is damaged and cannot be read. The RAID array 152 reconstructs the non-working sector 162 by combining working sector 160a, working sector 160b, and working sector 160c. That is, the sector data 164a of the working sector 160a, sector data 164b of working sector 160b, and parity data 166 of working sector 160c are combined by a recovery module 168, which outputs a service of I/O request 170. The service of I/O request 170 includes a regenerated version of the data in the non-working sector 162. In this manner, the I/O request 172 does not generate an error because the RAID array 152 can reconstruct the data of the non-working sector 162.

Figure 2:
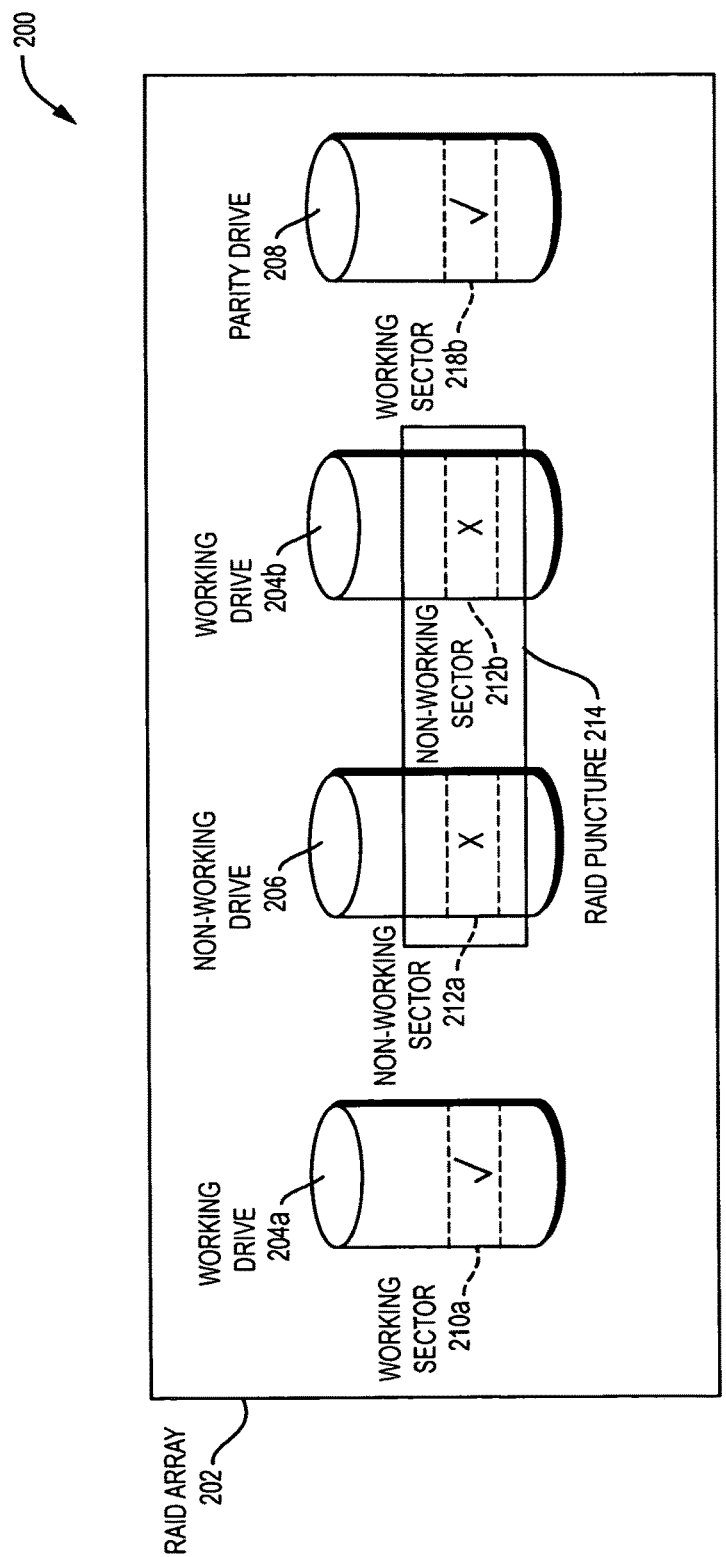
FIG. 2 is a block diagram illustrating another embodiment of a RAID array.

FIG. 2 is a block diagram 200 illustrating another embodiment of a RAID array 202. In this embodiment, the RAID array 202 includes working drives 204a-b, non-working drive 206, and a parity drive 208. The working drive 204a includes a working sector 210a. The working drive 204b, however, includes a non-working sector 212b. The non-working drive 206 includes a non-working sector 212a, that corresponds to working sectors 210a and 218b and non-working sector 212b. In fact, since the non-working drive 206 is disabled, none of its sectors are working. The parity drive 208 includes working sector 218b. The RAID array 202 cannot reconstruct data from the non-working sectors 212a-b because too much data is missing from the RAID array 202. The non-working sectors 212a-b, which correspond to each other in location on their respective drives, are considered as a RAID puncture 214. The RAID puncture 214 prevents the recovery of data because two pieces of data are missing. The RAID puncture 214 can also be caused by two fully non-working drives, or by two working drives with two non-working sectors that happened to be in the same location on the respective drives. The latter can be less common because it requires the locations to coincide with each other, however it is possible.

Figure 3A:
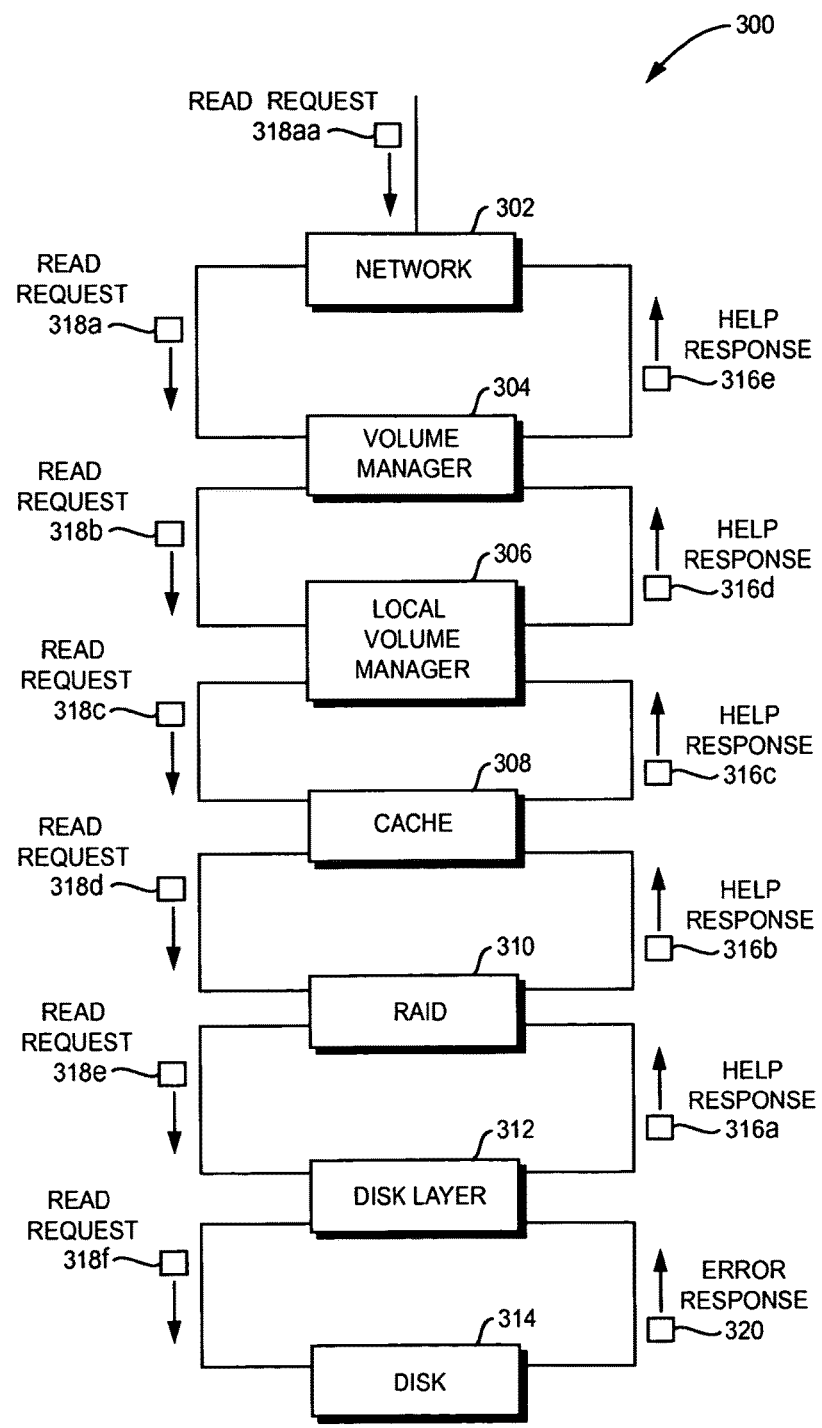
FIG. 3A is a block diagram illustrating an example embodiment of a layer structure of a storage system.

FIG. 3A is a block diagram 300 illustrating an example embodiment of a layer structure of a storage system. The storage system includes a network layer 302, a volume manager layer 304, a local volume manager layer 306, a cache layer 308, a RAID layer 310, and a disk layer 312. Upon receiving a read request 318aa, the network layer 302 may fulfill the request 318aa by generating request 318a to the volume manager layer 304. The volume manager layer 304 may fulfill request 318a by generating read request 318b to the local volume manager layer 306. Local volume manager layer 306 may fulfill request 318b by generating read request 318c to the cache layer 308. The cache layer 308 may fulfill request 318c by generating read request 318d to the RAID layer 310. The RAID layer 310 may fulfill request 318d by generating read request 318e to the disk layer 312. The disk layer 312 then forwards the read request 318f to the disk 314 (e.g., the physical disk).

The disk 314 returns an error response 320 (responsive of request 318f) to the disk layer 312 because of a bad drive or a bad sector on the physical drive. The disk layer 312 then issues a help response 316a (responsive of request 318e) to the RAID layer 310. The help response 316a requests that the higher layer (e.g., the RAID layer 310) attempt to determine a recovery mechanism to fulfill the request 318d. For example, the RAID layer 310 may attempt a reconstruction of the data requested in request 318d, as described in FIG. 1B. If the attempt is unsuccessful, as described in FIG. 2A, the RAID layer 310 then issues a help response 316b (responsive of request 318d) to the cache layer 308. If the cache layer 308 determines that no recovery mechanism can fulfill request 318c, the cache layer 308 issues a help response 316c (responsive of request 318c) to the local volume manager 306. If the local volume manager layer 306 determines that no recovery mechanism can fulfill request 318b, the local volume manager layer 306 issues a help response 316d (responsive of request 318b) to the volume manager layer 304. If the volume manager layer 304 determines that no recovery mechanism can fulfill request 318a, the volume manager layer 304 issues a help response 316e (responsive of request 318a) to the network layer 302.

Figure 3B:
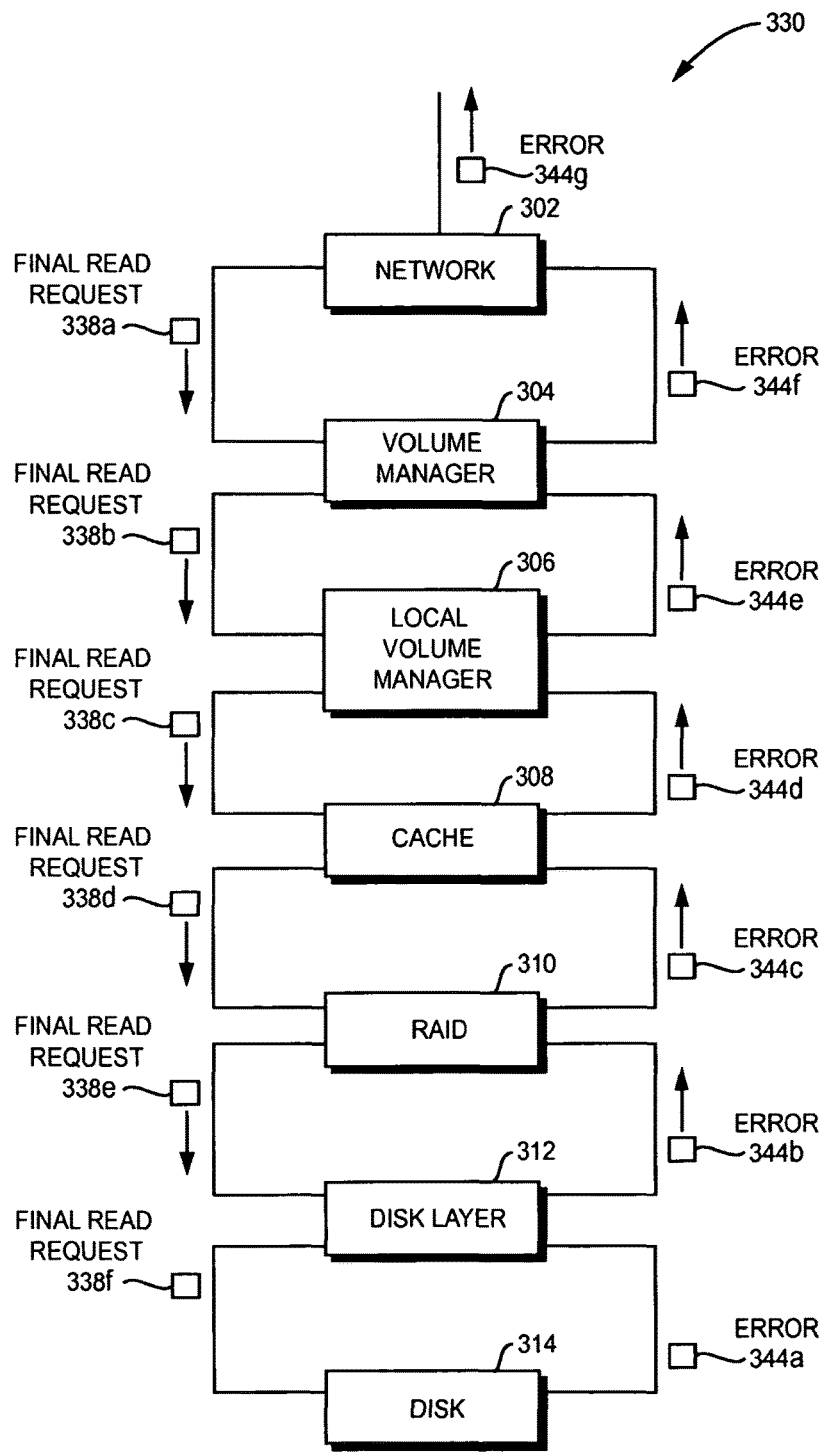
FIG. 3B is a block diagram illustrating the example embodiment of the layer structure of the storage system.

FIG. 3B is a block diagram 330 illustrating the example embodiment of the layer structure of the storage system. FIG. 3B is a logical continuation of the storage system illustrated in FIG. 3A. In relation to FIG. 3B, upon receiving help response 316e (FIG. 3A), and upon determining that no recovery mechanism can fulfill request 318aa (FIG. 3A), the network layer 302 issues a final read request 338a to the volume manager layer 304 (FIG. 3B). Volume manager layer 304 may fulfill final request 338a by generating final read request 338b the local volume manager 306. The local volume manager layer 306 may fulfill final request 338b by generating final read request 338c to the cache layer 308. The cache layer 308 may fulfill final request 338c by generating final read request 338d to the RAID layer 310. The RAID layer 310 may fulfill final request 338d by generating final read request 338e to the disk layer 312. The disk layer 312 then issues the read request 338f to the disk 314. This need not be a final request because disk hardware generally does not support that model. However, the disk layer 312 may fulfill final request 338e differently from the initial read request 318f (FIG. 3A). For example, it may configure more aggressive error correction on a final request than on an original request.

The disk 314 then issues an error response 344a (responsive of request 338f) to the disk layer 312. A layer generally should not respond to a final request with a help response, so the disk layer 312 issues an error response 344b (responsive of request 338e) to the RAID layer 310. The RAID layer 310 then issues an error response 344c (responsive of request 338d) to the cache layer 308. The cache layer 308 then issues an error response 344d (responsive of request 338c) to the local volume manager layer 306. The local volume manager layer 306 then issues an error response 344e (responsive of request 338b) to the volume manager 304. The volume manager layer 304 then issues an error response 344f (responsive of request 338a) to a network layer 302. The network layer 302 then issues an error response 344g (responsive of the original request 318aa of FIG. 3A). The error from the disk is thus propagated back to the original requestor, but not until every layer above the disk layer has been asked for help, every layer above the disk layer has exhausted its recovery mechanisms, and every layer above the disk layer has executed a final request.

Figure 3C:
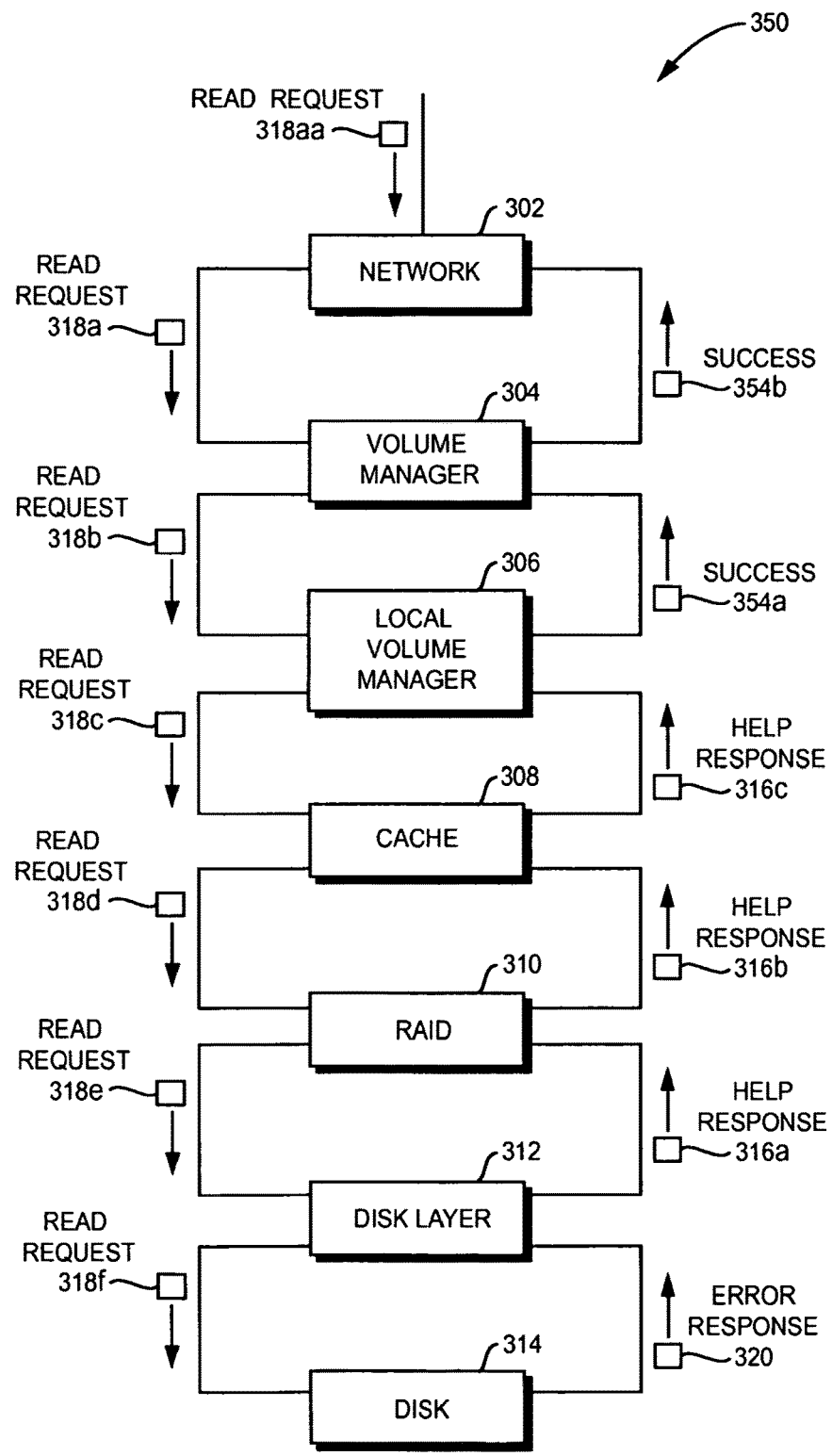
FIG. 3C is a block diagram illustrating the example embodiment of the layer structure of the storage system.

FIG. 3C is a block diagram 350 illustrating the example embodiment of the layer structure of the storage system. FIG. 3C is a logical continuation of the storage system illustrated in FIGS. 3A-B. The read requests 318a-f are propagated from the network layer 302 to the volume manager layer 304, the local volume manager layer 306, the cache layer 308, the RAID layer 310, and the disk layer 312 in the same manner as described in FIG. 3A. In relation to FIG. 3C, the disk 314 responds by issuing the error 320 (responsive of request 318f to the disk layer 312. The disk layer 312 issues the help response 316a (responsive of request 318e) to the RAID layer 310. If the RAID layer 310 determines that no recovery mechanism can fulfill request 318d, the RAID layer 310 issues the help response 316b (responsive of request 318d) to the cache layer 308. If the cache layer 308 determines that no recovery mechanism can fulfill request 318c, then the cache layer 308 issues the help response 316c (responsive of request 318c) to the local volume manager layer 306. However, the local volume manager layer 306 determines that a recovery mechanism can fulfill request 318b, such as accessing a valid and current region of an asynchronous replica. The local volume manager 306 successfully fulfills request 318b by executing this recovery mechanism, and issues a success response 354a (responsive of request 318b) to the volume manager layer 304. The volume manager layer 304 then propagates the success response 354b (responsive of request 318a) to the network layer 302. The network layer 302 then fulfills the original I/O request 318aa with the data represented in the success messages 354a-b. The recovery mechanism employed by the local volume manager layer 306 may be that as disclosed in "Automatic Failure Recovery Using Snapshots And Replicas" by Damon Hsu-Hung et. al, U.S. patent application Ser. No. 13/796,876, hereinafter incorporated by reference in its entirety, or data recovery from an information dispersal system, such as that disclosed in "Systems, methods, and apparatus for subdividing data for storage in a dispersed data storage grid" by Gladwin et al., U.S. Pat. No. 7,953,937, hereinafter incorporated by reference in its entirety. Other recovery methods and systems are suitable.

It should also be known that, while the foregoing system and method describes RAID arrays and RAID punctures, that these embodiments may be generalized to any generic storage system having data loss.

Figure 4:
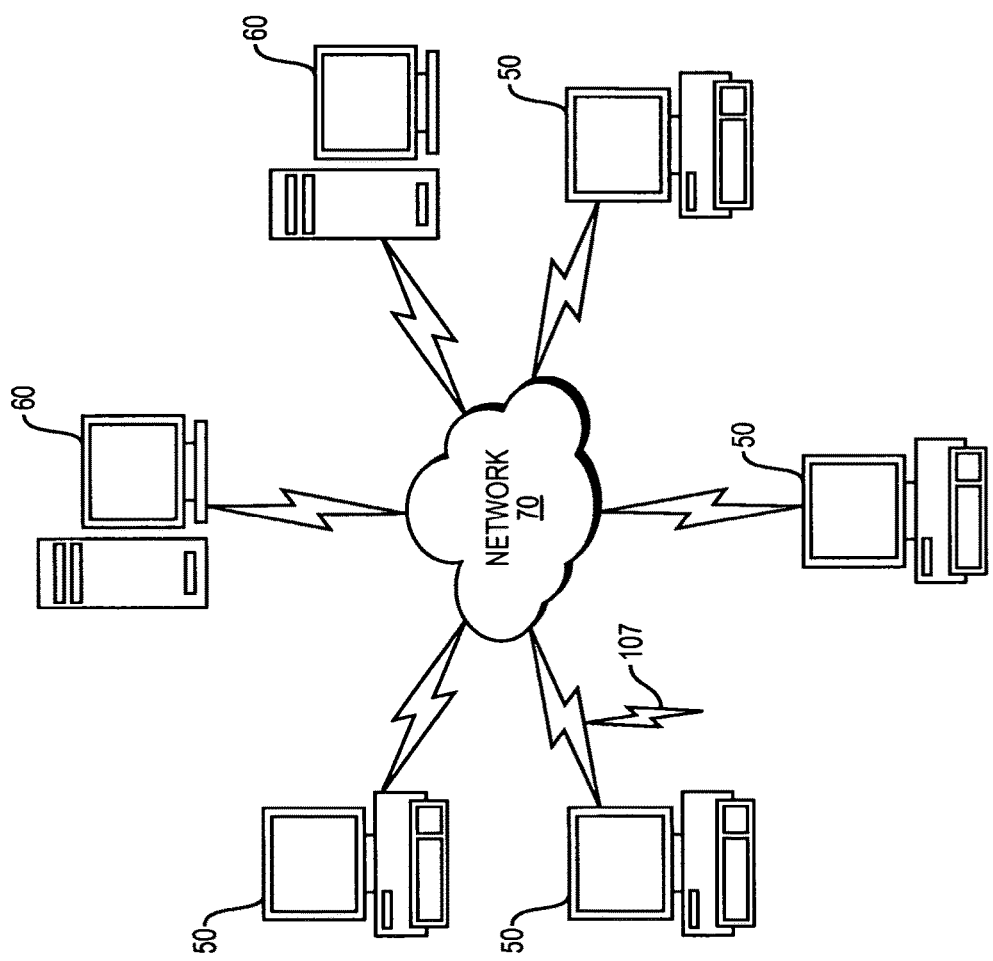
FIG. 4 illustrates a computer network or similar digital processing environment in which the present invention may be implemented.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
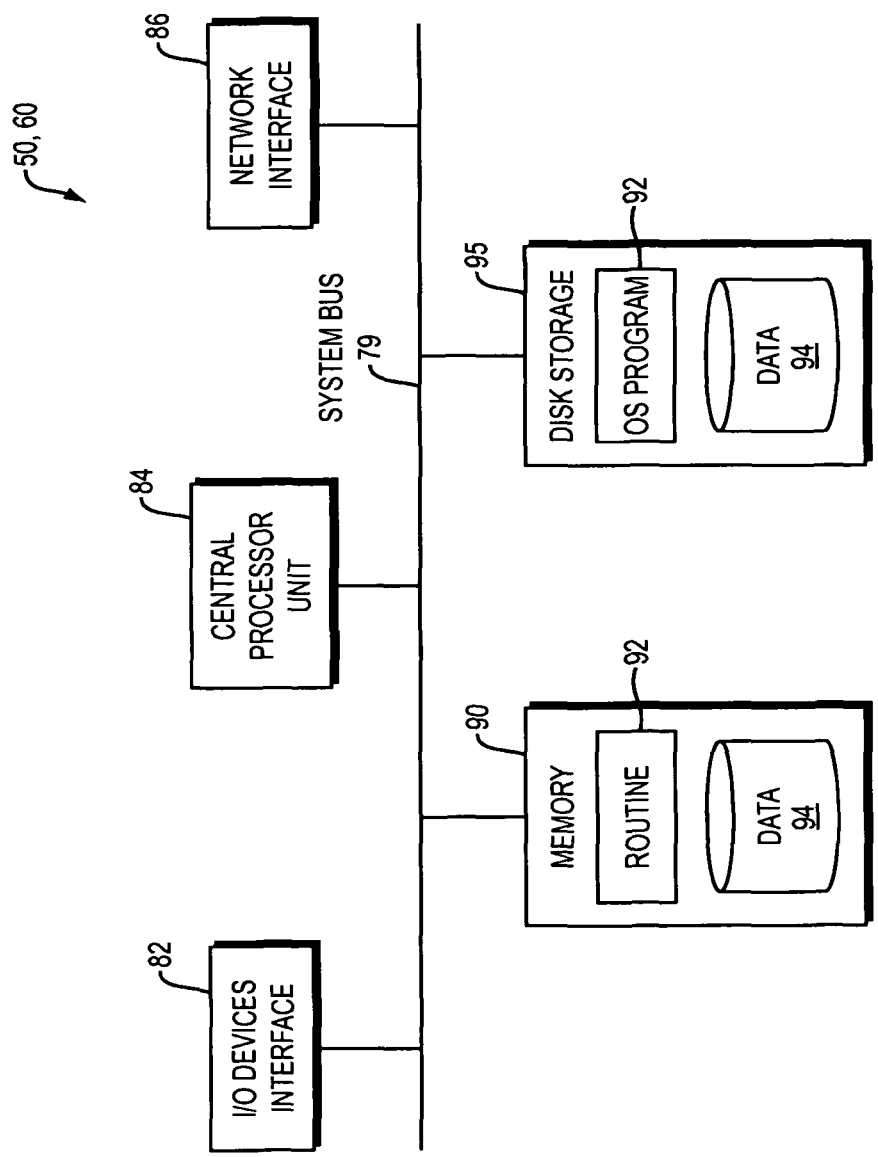
FIG. 5 is a diagram of the internal structure of a computer (e.g., client processor/device or server computers) in the computer system of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., data recovery coordination code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of recovering data in response to a failed input/output request, the method comprising:
   in a memory storage stack having layers, including a lowest layer, at least one intermediate layer, and a highest layer, in a hierarchical order, wherein each layer has associated storage memory and one or more associated processor and wherein each intermediate layer has a first single layer immediately lower in hierarchical order and a second single layer immediately above in hierarchical order:
   seeking data in hierarchical order from the highest layer to the lowest layer in the storage stack and responsive to a failed input/output (I/O) request for data, from a higher layer of the memory storage stack to a lower layer of the memory storage stack in the hierarchical order, generating, at the lower layer, a first help response and sending the first help response from the lower layer to the higher layer to recover the data;
   at the higher layer, determining whether a recovery mechanism can fulfill the I/O request and, if not, generating a second help response and sending the second help response to a next higher layer of the memory storage stack in the hierarchical order;
   at the next higher layer, determining whether a recovery mechanism can fulfill the I/O request and, if not, generating a third help response and sending the third help response to an even next higher layer of the memory storage stack in the hierarchical order;
   in response to determining a recovery mechanism can fulfill the I/O request, obtaining the data using the recovery mechanism and providing the data to the higher layer in response to the I/O request; and
   upon the help response reaching the highest layer of the memory storage stack, generating an error at the highest layer.

2. The method of claim 1 wherein at least one of the first help response, second help response, and third help response is sent to a layer in the memory storage stack that can access snapshots or replicas as a recovery mechanism to fulfill I/O requests.

3. The method of claim 1 wherein at least one of the first help response, second help response, and third help response is sent to a layer in the memory storage stack that can access cloud storage or an information dispersal system as a recovery mechanism to fulfill I/O requests.

4. The method of claim 1 wherein at least one of the first help response, second help response, and third help response is sent to a layer in the memory storage stack that can perform RAID reconstruction as a recovery mechanism to fulfill I/O requests.

5. The method of claim 1 wherein at least one of the first help response, second help response, and third help response is sent to a layer in the memory storage stack that can access alternate communications paths as a recovery mechanism to fulfill I/O requests.

6. The method of claim 1 wherein the layers include at least one of a disk, a drive, a RAID controller, a cache, a volume manager, a local volume manager, and a network layer.

7. A memory storage stack configured to recover data in response to a failed input/output request, the memory storage stack comprising:
   layers of respective storage memories, including a lowest layer, at least one intermediate layer, and a highest layer, in a hierarchical order, wherein each layer stores respective computer code instructions and has one or more associated processor and wherein each intermediate layer has a first single layer immediately lower in hierarchical order and a second single layer immediately above in hierarchical order and the layers configured such that:
   data is sought in hierarchical order from the highest layer to the lowest layer in the storage stack and a lower layer of the memory storage stack, along with its one or more associated processor and respective computer code instructions, is configured to, responsive to a failed input/output (I/O) request for data, from a higher layer of the memory storage stack to the lower layer of the stack in the hierarchical order, generate a first help response and send the first help response from the lower layer to the higher layer to recover the data;
   the higher layer, along with its one or more associated processor and respective computer code instructions, is configured to determine whether a recovery mechanism can fulfill the I/O request and, if not, generate a second help response and send the second help response to a next higher layer of the memory storage stack in the hierarchical order;
   the next higher layer, along with its one or more associated processor and respective computer code instructions, is configured to determine whether a recovery mechanism can fulfill the I/O request and, if not, generate a third help response and send the third help response to an even next higher layer of the memory storage stack in the hierarchical order;
   in response to a layer determining a recovery mechanism can fulfill the I/O request, the layer, along with its one or more associated processor and respective computer code instructions, is configured to obtain the data using the recovery mechanism and provide the data to the higher layer in response to the I/O request; and upon the help response reaching the highest layer of the memory storage stack, the highest layer, along with its one or more associated processor and respective computer code instructions, is configured to generate an error at the highest layer.

8. The storage stack of claim 7 wherein at least one of the first help response, second help response, and third help response is sent to a layer in the memory storage stack that can access snapshots or replicas as a recovery mechanism to fulfill I/O requests.

9. The storage stack of claim 7 wherein at least one of the first help response, second help response, and third help response is sent to a layer in the memory storage stack that can access cloud storage or an information dispersal system as a recovery mechanism to fulfill I/O requests.

10. The storage stack of claim 7 wherein at least one of the first help response, second help response, and third help response is sent to a layer in the memory storage stack that can perform RAID reconstruction as a recovery mechanism to fulfill I/O requests.

11. The storage stack of claim 7 wherein at least one of the first help response, second help response, and third help response is sent to a layer in the memory storage stack that can access alternate communications paths as a recovery mechanism to fulfill I/O requests.

12. The storage stack of claim 7 wherein the layers include at least one of a disk, a drive, a RAID controller, a cache, a volume manager, a local volume manager, and a network layer.

13. A non-transitory computer readable medium configured to store instructions for recovering data in response to a failed input/output request in a memory storage stack having layers, including a lowest layer, at least one intermediate layer, and a highest layer, in a hierarchical order, wherein each layer has associated storage memory and one or more associated processor and wherein each intermediate layer has a first single layer immediately lower in hierarchical order and a second single layer immediately above in hierarchical order, the instructions, when executed by a processor, causes:

seeking data in hierarchical order from the highest layer to the lowest layer in the storage stack and responsive to a failed input/output (I/O) request for data, from a higher layer of the memory storage stack to a lower layer of the memory storage stack in the hierarchical order, generating, at the lower layer, a first help response and sending the first help response from the lower layer to the higher layer to recover the data;

at the higher layer, determining whether a recovery mechanism can fulfill the I/O request and, if not, generating a second help response and sending the second help response to a next higher layer of the memory storage stack in the hierarchical order;

at the next higher layer, determining whether a recovery mechanism can fulfill the I/O request and, if not, generating a third help response and sending the third help response to an even next higher layer of the memory storage stack in the hierarchical order;

in response to determining a recovery mechanism can fulfill the I/O request, obtaining the data using the recovery mechanism and providing the data to the higher layer in response to the I/O request; and upon the help response reaching the highest layer of the memory storage stack, generating an error at the highest layer.

14. The non-transitory computer readable medium of claim 13 wherein at least one of the first help response, second help response, and third help response is sent to a layer in the memory storage stack that can access snapshots or replicas as a recovery mechanism to fulfill I/O requests.

15. The non-transitory computer readable medium of claim 13 wherein at least one of the first help response, second help response, and third help response is sent to a layer in the memory storage stack that can access cloud storage or an information dispersal system as a recovery mechanism to fulfill I/O requests.

16. The non-transitory computer readable medium of claim 13 wherein at least one of the first help response, second help response, and third help response is sent to a layer in the memory storage stack that can perform RAID reconstruction as a recovery mechanism to fulfill I/O requests.

17. The non-transitory computer readable medium of claim 13 wherein at least one of the first help response, second help response, and third help response is sent to a layer in the memory storage stack that can access alternate communications paths as a recovery mechanism to fulfill I/O requests.

18. The non-transitory computer readable medium of claim 13 wherein the layers include at least one of a disk, a drive, a RAID controller, a cache, a volume manager, a local volume manager, and a network layer.

* * * * *